(12) United States Patent
Kwag et al.

(10) Patent No.: US 9,295,355 B2
(45) Date of Patent: Mar. 29, 2016

(54) COOKING APPLIANCE

(71) Applicant: LG ELECTRONICS INC., Seoul (KR)

(72) Inventors: Dongseong Kwag, Seoul (KR); Yangkyeong Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 220 days.

(21) Appl. No.: 14/084,343

(22) Filed: Nov. 19, 2013

(65) Prior Publication Data

US 2014/0137857 A1    May 22, 2014

(30) Foreign Application Priority Data

Nov. 19, 2012    (KR) .................. 10-2012-0130832

(51) Int. Cl.
*A47J 27/06*    (2006.01)
*A47J 27/04*    (2006.01)

(52) U.S. Cl.
CPC .................................... *A47J 27/04* (2013.01)

(58) Field of Classification Search
CPC ........................... A47J 2027/043; A47J 27/04
USPC .............................. 126/369, 377.1, 20, 369.3
See application file for complete search history.

(56) References Cited

U.S. PATENT DOCUMENTS

| | | | | |
|---|---|---|---|---|
| 3,823,657 | A * | 7/1974 | Luetolf | 99/337 |
| 4,655,192 | A * | 4/1987 | Jovanovic | 126/20 |
| 4,660,542 | A * | 4/1987 | Scherer | 126/378.1 |
| 6,152,024 | A * | 11/2000 | Tippmann | 99/472 |
| 2001/0032599 | A1* | 10/2001 | Fischer et al. | 122/35 |
| 2010/0054717 | A1* | 3/2010 | Lee et al. | 392/401 |

\* cited by examiner

*Primary Examiner* — Avinash Savani
(74) *Attorney, Agent, or Firm* — Dentons US LLP

(57) ABSTRACT

A cooking appliance, including: a cavity forming a cooking space of foods; a steam generator to generate steam for cooking the foods; a cooking container placed on a support part formed in the cavity, and having a cooking chamber to cook the foods and a steam hole to supply the steam generated from the steam generator; and a container cover to cover the cooking container.

10 Claims, 6 Drawing Sheets

COOKING APPLIANCE

CROSS-REFERENCE TO RELATED APPLICATIONS

The present application claims priority under 35 U.S.C. 119 and 35 U.S.C. 365 to Korean Patent Application No. 10-2012-0130832 (filed on Nov. 19, 2012), which is hereby incorporated by reference in its entirety as if fully set forth herein.

BACKGROUND

The present disclosure relates to a cooking appliance.

Generally, the cooking appliance is an appliance for cooking foods by heating the foods using a heating source.

Recently, a cooking appliance which generates steam to cook foods by the steam has been proposed.

Such steam cooking appliance includes a cavity forming a cooking space where the foods are cooked, and a steam generator generating the steam. The steam generator is positioned outside the cavity, and the steam generated from the steam generator is supplied to the cavity through a steam hole formed in the cavity.

According to a steam appliance in the related art, since the steam supplied to the cavity is dispersed to the entire area in the cavity, there is a problem in that time for cooking foods placed in the cavity is increased.

Further, since the steam is dispersed to the entire area in the cavity, more steam is required in order to cook the foods, and as a result, there is a problem in that correspondingly more water is also required and thus, a larger capacity water tank is required. When the capacity of the water tank is increased, there is a problem in that the size of the cavity is decreased or the cooking appliance is increased to accommodate the large tank.

Further, since the steam is directly supplied to the cavity, steam condensate accumulates at the bottom of the cavity after the cooking of the foods is completed, and thus, there is a problem in that periodical cleaning is required. In order to drain the steam condensate, a drain hole needs to be formed in the cavity. However, in this case, there is a problem in that food dregs also pass through the drain hole and into the cooking appliance.

SUMMARY

Embodiments described herein exemplify a cooking appliance.

In one embodiment, a cooking appliance may include: a cavity to form a cooking space of foods; a steam generator to generate steam for cooking the foods; a cooking container placed on a support part formed in the cavity, and having a cooking chamber to cook the foods and a steam hole to supply the steam generated from the steam generator; and a container cover to cover the cooking container.

In another embodiment, a cooking appliance may include: a cavity to form a cooking space of foods; a steam generator generating steam to cook the foods and including a steam supply pipe to supply the steam and a nozzle to inject the steam; and a cooking container placed on a support part formed in the cavity, and having a cooking chamber to cook the foods and a steam hole to supply the steam generated from the steam generator to the cooking chamber.

The details of one or more embodiments are set forth in the accompanying drawings and the description below. Other features will be apparent from the description and drawings, and from the claims.

DETAILED DESCRIPTION OF THE EMBODIMENTS

Reference will now be made in detail to the embodiments of the present disclosure, examples of which are illustrated in the accompanying drawings.

In the following detailed description of the preferred embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense.

Figure 1:
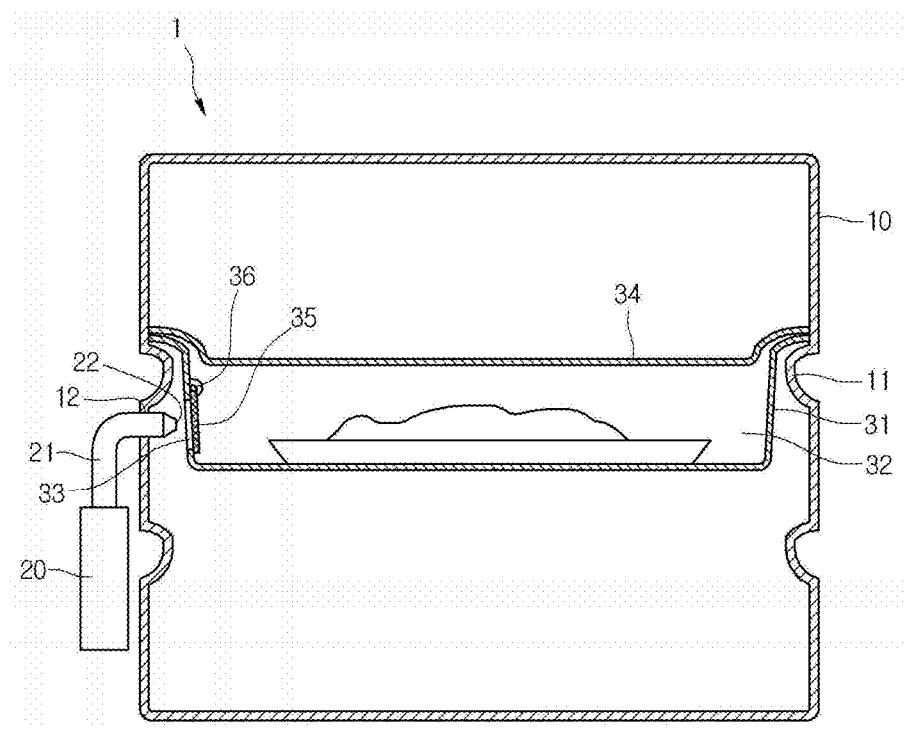
FIG. 1 is a diagram illustrating a cooking appliance according to a first exemplary embodiment.
Figure 2:
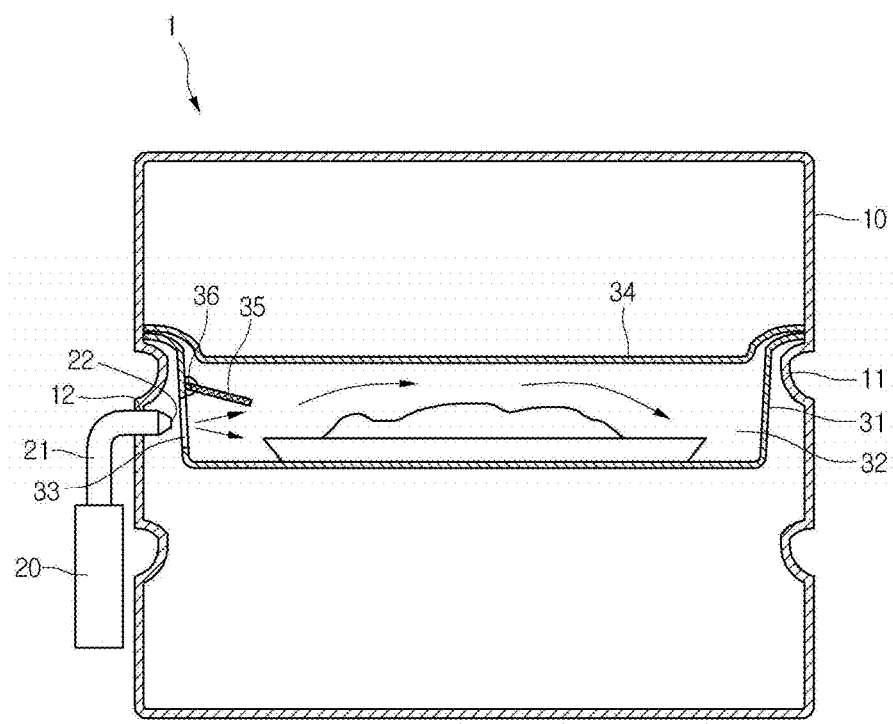
FIG. 2 is a diagram illustrating a form in which foods is cooked by steam generated from a steam generator according to the first embodiment.

FIG. 1 is a diagram illustrating a cooking appliance according to a first exemplary embodiment, and FIG. 2 is a diagram illustrating a form in which foods is cooked by steam generated from a steam generator according to the first embodiment.

Referring to FIGS. 1 and 2, a cooking appliance 1 according to a first embodiment may include a cavity 10 to form a cooking space of foods, and a steam generator 20 to generate steam. Of course, although not illustrated, the cooking appliance 1 may further include an additional heating source for cooking the foods.

One or more support part 11 to support a cooking container 31 to be described below may be formed at both sides of the cavity 10. As an example, FIG. 1 illustrates that a plurality of support parts 11 is formed at each of both sides of the cavity 10. When the plurality of support parts 11 is formed at each of both sides of the cavity 10, the plurality of support parts 11 may be spaced apart from each other in a vertical direction.

The support part 11 may be formed to protrude inward or be dent outward from both sides of the cavity 10. In FIG. 1, an example in which the support part 11 protrudes inward from both sides of the cavity 10 will be described.

The steam generator 20 receives water from a water tank (not illustrated) to generate the steam. The water tank may be positioned higher than the steam generator 20. Of course, in the case where a pump is provided on a pipe connecting the water tank and the steam generator 20, there is no limit to a layout position of the water bank. As another example, the steam generator 20 serves as the water tank without a separate water tank to generate the steam by heating the water stored in the steam generator 20.

A steam supply pipe 21 is connected to the steam generator 20, and a nozzle 22 for injecting the steam may be provided on the steam supply pipe 21. In addition, a hole 12 through which the steam generated from the steam generator 20 passes may be formed in the cavity 10.

The nozzle 22 may be positioned in the hole 12 or outside the cavity 10, or protrude inward the cavity 10. The steam supply pipe may pass through the hole 12 so that the nozzle 22 protrudes inward the cavity 10.

Meanwhile, the cooking appliance 1 of the embodiment may further include a cooking container 31 receiving the foods, and a container cover 34 to cover the foods received in the cooking container 31.

The cooking container 31 may include a cooking chamber 32 having a predetermined height. That is, the cooking container 31 may be recessed at a predetermined height in order to receive the foods.

A steam hole 33 for supplying the steam may be formed in the cooking container 31. The steam hole 33 may be positioned at a height corresponding to the hole 12 while the cooking container 31 is placed on the support part 11.

An opening and closing member to open and close the steam hole 33 may be provided on the cooking container 31. The opening and closing member may include an opening and closing plate 35 and a rotating shaft 36. A hinge (not illustrated) for coupling with the rotating shaft 36 may be formed on an inner wall of the cooking container 31. In addition, although not illustrated, an elastic member elastically supporting the opening and closing member may be provided in the hinge. The elastic member may apply elastic force to the opening and closing member so that the opening and closing member rotates in a direction of closing the steam hole 33. As another example, the elastic member is omitted, and the steam hole 33 may be closed by a self-load of the direction of closing the steam hole 33.

When the steam is injected from the nozzle, the opening and closing plate 35 rotates by injection pressure of the steam to open the steam hole 33.

In order to cook the foods by using the steam, after the foods are received in the cooking container 31 and the cooking container 31 is covered by the container cover 34, the cooking container 31 may be placed on the support part 11. Thereafter, the user may select a steam cooking mode through an input part (not illustrated).

When the steam cooking mode is selected, the steam is generated from the stream generator 20, and the generated steam passes though the steam supply pipe 21 to be injected into the cavity 10 through the nozzle 22. In this case, since the steam hole 33 of the cooking container 31 faces the nozzle 22, the steam injected through the nozzle 22 flows toward the opening and closing plate 35. Then, the opening and closing plate 35 rotates by the injection pressure of the steam, and the steam hole 33 is opened to be supplied to the cooking chamber 32 in the cooking container 31. Accordingly, the foods received in the cooking container 31 may be cooked by the steam supplied to the cooking chamber 32.

In the above embodiment, the opening and closing member opens and closes the steam hole 33, but the opening and closing member is omitted and the steam hole 33 may keep to be opened.

According to the embodiment, the nozzle 22 is spaced apart from the cooking container 31, but the steam injected from the nozzle 22 is not dispersed to the cavity 10 by the injection pressure to be sufficiently supplied to the cooking container 31.

Accordingly, since the steam is supplied into the cooking container 31 which has a smaller volume than the cavity, there is an advantage of rapidly cooking the foods. In addition, since the foods are rapidly cooked, there is advantage in that a use amount of water for cooking the foods and power consumption of the steam generator are reduced.

Further, even though the steam condensate is generated after the cooking of the foods is completed, the generated steam condensate exists in the cooking container 31 and thus the cavity 10 keeps clean, and as a result, there is an advantage in that cleaning of the cavity 10 is not required.

Figure 3:
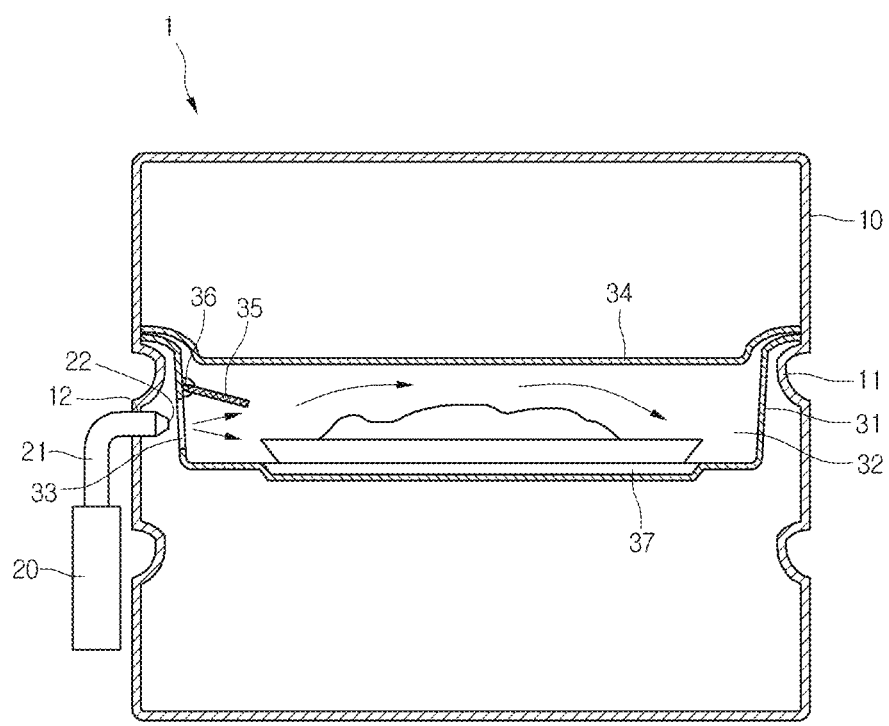
FIG. 3 is a diagram illustrating a cooking appliance according to a second exemplary embodiment.

FIG. 3 is a diagram schematically illustrating a cooking appliance according to a second exemplary embodiment.

The embodiment is the same as the first embodiment in other parts, but there is a difference in a structure of the cooking container. Accordingly, hereinafter, only specific parts of the embodiment will be described.

Referring to FIG. 3, a storing part 37 for storing the steam condensate may be formed at a bottom surface of the cooking container 31 of the embodiment. The storing part 37 may be formed by denting the bottom of the cooking container 31. In this case, a part other than the storing part 37 may support the foods on the bottom surface of the cooking container 31.

Accordingly, according to the embodiment, since the steam condensate is stored in the storing part 37, the steam condensate may be prevented from contacting the foods.

Figure 4:
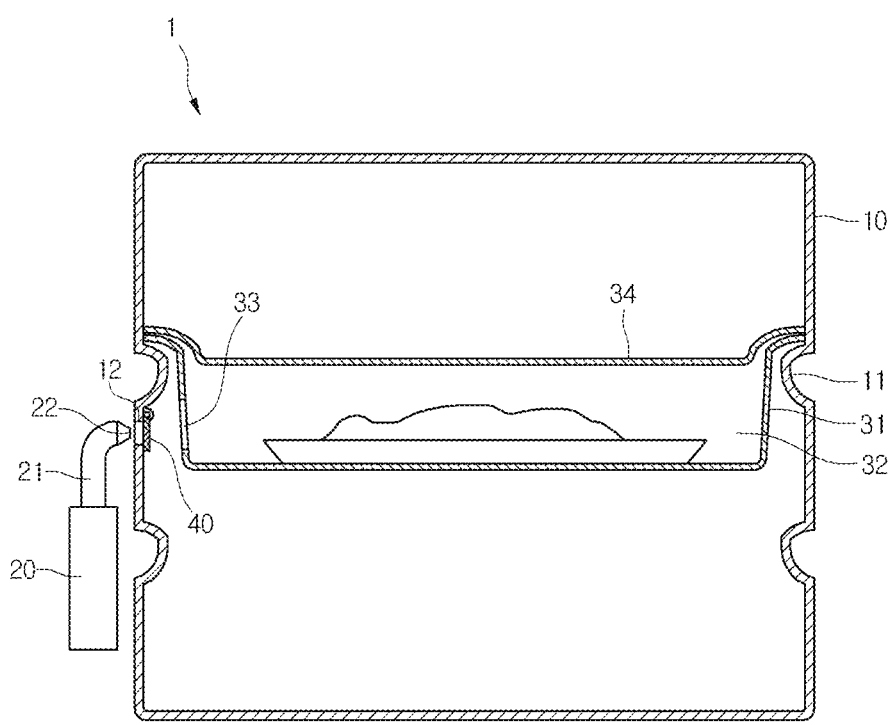
FIG. 4 is a diagram illustrating a cooking appliance according to a third exemplary embodiment.

FIG. 4 is a diagram schematically illustrating a cooking appliance according to a third exemplary embodiment.

The embodiment is the same as the first embodiment in other parts, but there is a difference in structures of a cavity and a cooking container. Accordingly, hereinafter, only specific parts of the embodiment will be described.

Referring to FIG. 4, an opening and closing member 40 for opening and closing a hole 12 through which steams passes may be provided in the cavity 10. Since the opening and closing member 40 may have the same structure as the opening and closing member of the first embodiment, a detailed description thereof will be omitted.

The nozzle 22 may be positioned outside the cavity 10, or in the hole 12. However, the opening and closing member 40 smoothly rotates by pressure of the steam injected from the nozzle 22, and the nozzle 22 may be spaced apart from the opening and closing member 40 so as to prevent the nozzle 22 from being damage by the opening and closing member.

Figure 5:
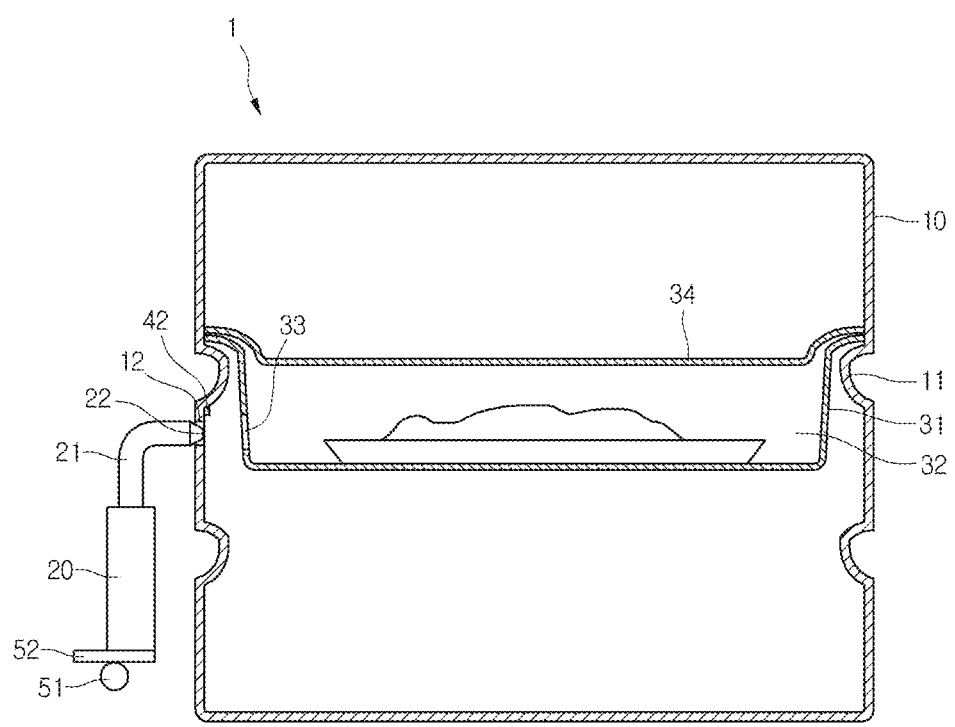
FIGS. 5 and 6 are diagrams illustrating a cooking appliance according to a fourth exemplary embodiment.
Figure 6:
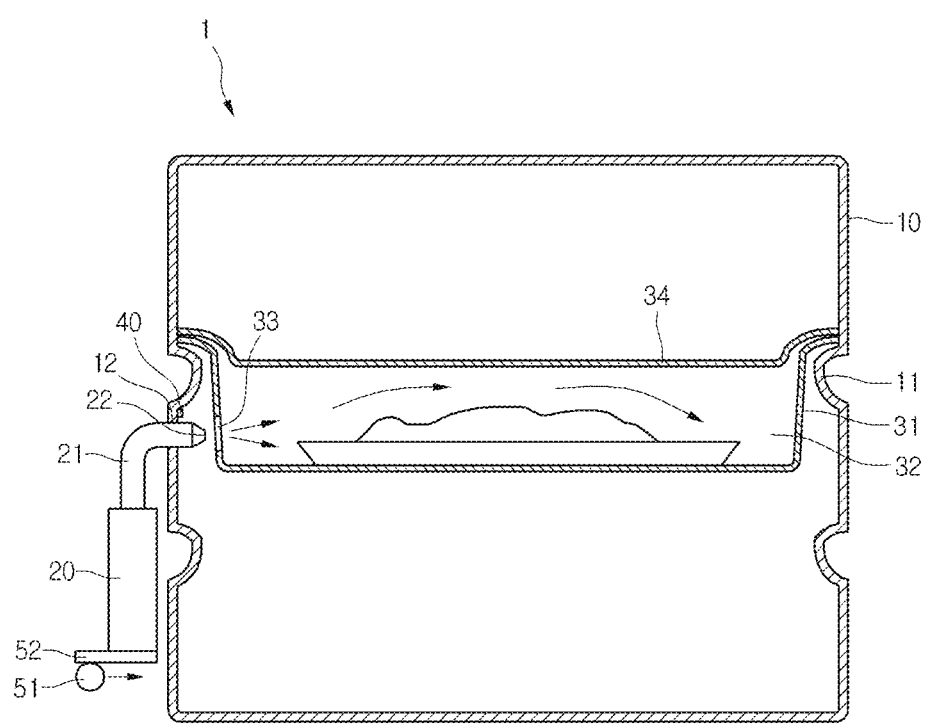

FIGS. 5 and 6 are diagrams schematically illustrating a cooking appliance according to a fourth exemplary embodiment.

Referring to FIGS. 5 and 6, a support part 52 supporting the steam generator 20 may be provided outside of the cavity 10. A rack gear is formed at the support part 52, and a pinion gear 51 may be connected to the rack gear. In addition, the pinion gear 51 may be coupled with a motor (not illustrated).

When the motor operates, the pinion gear 51 rotates, and the support part 52 may move in a horizontal direction by the rotation of the pinion gear 51.

A sensor 42 for sensing the cooking container 31 may be provided in the cavity 10. For example, the sensor 42 may include an infrared sensor, or a light emitting sensor and a light receiving sensor.

In the embodiment, when the cooking container 31 is sensed, the steam generator 20 may be controlled so that the steam is generated from the steam generator 20.

When a steam cooking mode is selected, the motor rotates in one direction and thus the support part 52 may move to the right based on FIG. 6. Then, the steam generator, the steam supply pipe, and the nozzle may move to the right.

Accordingly, the nozzle 22 is close to the cooking container 31 and thus the steam may be smoothly supplied to the cooking container 31.

When the steam cooking mode ends, the motor rotates in the other direction and thus the support part 52 may move to the left. Then, the steam generator, the steam supply pipe, and the nozzle may move to the left. Accordingly, when the cooking is completed, a distance from the cavity 10 to the nozzle 22 is minimized, thereby preventing the nozzle 22 from being nozzle 22.

As another example, the steam cooking mode may include a first mode for cooking the foods in the cooking container 31 and a second mode for cooking the foods in the cavity 10. In addition, when the first mode is selected, the sensor 42 senses existence of the cooking container 31, and when the cooking container 31 is not sensed, the steam generator 20 keeps to stop, and information for alarming that the cooking container 31 is not sensed may be displayed on an alarming part (not illustrated).

As another example, the steam generator keeps to be fixed, and the nozzle may be moved. However, in this case, the steam supply pipe may be a flexible pipe of which a length may be controlled so that the nozzle may move.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A cooking appliance, comprising:
   a cavity forming a space for cooking foods;
   a steam generator to generate steam for cooking the foods;
   a cooking container on a first support part in the cavity, and including a cooking chamber to cook the foods, a steam hole to supply steam generated by the steam generator to the cooking chamber, and an opening and closing member to open and close the steam hole;
   a container cover to cover the cooking container;
   a second support part to support the steam generator; and
   a driving device to move the second support part,
   wherein the steam generator includes a steam supply pipe and a nozzle on the steam supply pipe aligned with the steam hole, and
   wherein a distance between the nozzle and the cooking container is varied by the driving device.

2. The cooking appliance of claim 1, further comprising a hole in the cavity to pass the steam to the cooking chamber, wherein the steam hole of the cooking container faces the hole formed in the cavity when the cooking container is placed on the first support part.

3. The cooking appliance of claim 1, wherein the cooking container further includes an elastic member providing elastic force to the opening and closing member in a direction in which the opening and closing member closes the steam hole.

4. The cooking appliance of claim 1, wherein the opening and closing member is rotated by the steam supplied to the cooking chamber to open the steam hole, and rotates by a self-load when the steam is not supplied to the cooking chamber to close the steam hole.

5. The cooking appliance of claim 1, further comprising a storing part storing condensate water generated when steam supplied to the cooking chamber is condensed is formed at a bottom surface of the cooking container.

6. The cooking appliance of claim 1, wherein the nozzle passes through the steam hole to be in the steam hole or to protrude into the cavity.

7. The cooking appliance of claim 1, wherein the nozzle is spaced apart from the opening and closing member while the opening and closing member closes the steam hole.

8. The cooking appliance of claim 1, further comprising an input part to select a steam cooking mode,
   wherein when the steam cooking mode is selected by the input part, the driving device moves the second support part so that the nozzle is closer to the cooking container.

9. The cooking appliance of claim 1, wherein when the steam cooking mode is completed, the driving device moves the second support part so that the nozzle is farther away from the cooking container.

10. The cooking appliance of claim 8, further comprising a sensing part to sense the cooking container is in the cavity,
    wherein the steam generator operates when the steam cooking mode is selected and the cooking container is sensed in the sensing part.

* * * * *